(12) United States Patent  (10) Patent No.: US 8,115,638 B2
Sakama  (45) Date of Patent: Feb. 14, 2012

(54) RFID THREAD, SHEET WITH RFID THREAD, AND PRINTING MACHINE FOR SHEET WITH RFID THREAD

(75) Inventor: Isao Sakama, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 328 days.

(21) Appl. No.: 12/392,158

(22) Filed: Feb. 25, 2009

(65) Prior Publication Data

US 2009/0303010 A1   Dec. 10, 2009

(30) Foreign Application Priority Data

Jun. 5, 2008 (JP) .................................. 2008-148580

(51) Int. Cl.
*G08B 13/14* (2006.01)
(52) U.S. Cl. ..................................... 340/572.7; 235/492
(58) Field of Classification Search ............... 340/572.7, 340/572.8; 235/488, 492
See application file for complete search history.

(56) References Cited

U.S. PATENT DOCUMENTS

| 7,185,823 | B2 * | 3/2007 | Inoue et al. | 235/492 |
| 7,253,735 | B2 * | 8/2007 | Gengel et al. | 340/572.7 |
| 7,413,130 | B2 * | 8/2008 | Inoue et al. | 235/492 |
| 7,489,248 | B2 * | 2/2009 | Gengel et al. | 340/572.7 |
| 7,861,938 | B2 * | 1/2011 | Oroku et al. | 235/492 |
| 7,868,766 | B2 * | 1/2011 | Gengel et al. | 340/572.7 |
| 7,909,258 | B2 * | 3/2011 | Kim | 235/492 |
| 2009/0090784 | A1 | 4/2009 | Oroku | |

FOREIGN PATENT DOCUMENTS

| CN | 101364275 | 2/2009 |
| EP | 1562140 A2 | 8/2005 |
| JP | 2004-139405 | 5/2004 |

* cited by examiner

*Primary Examiner* — John A Tweel, Jr.
(74) *Attorney, Agent, or Firm* — Brundidge & Stanger, P.C.

(57) ABSTRACT

An RFID thread which is mounted on a sheet and whose predetermined information can be read wirelessly from outside, the RFID thread includes: an IC chip recording the predetermined information; a first antenna consisting of an electrically continuous conductor which has a length corresponding to a size of the sheet and on which one or a plurality of the IC chips are mounted; and a base film made of resin for supporting the first antenna.

15 Claims, 12 Drawing Sheets

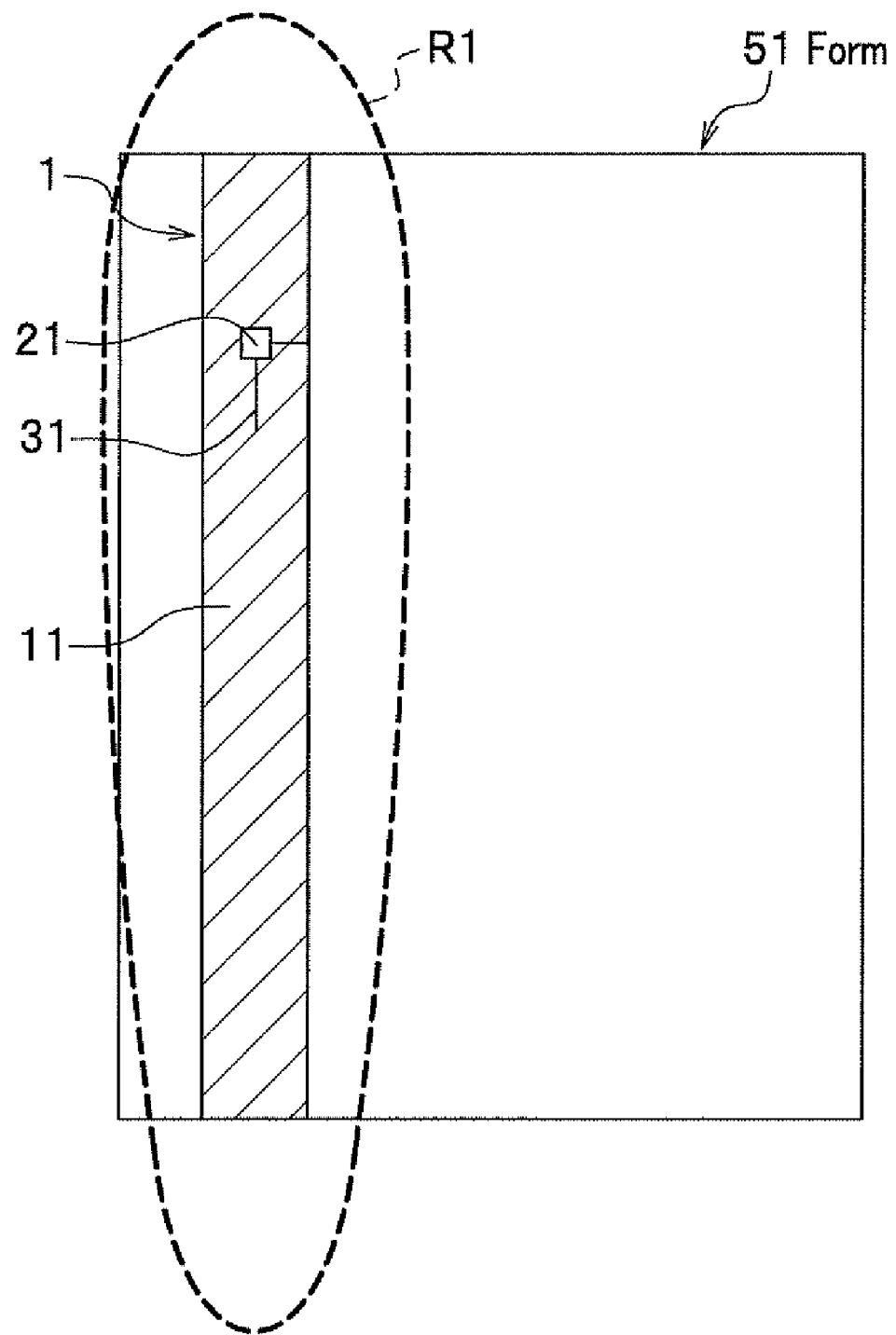

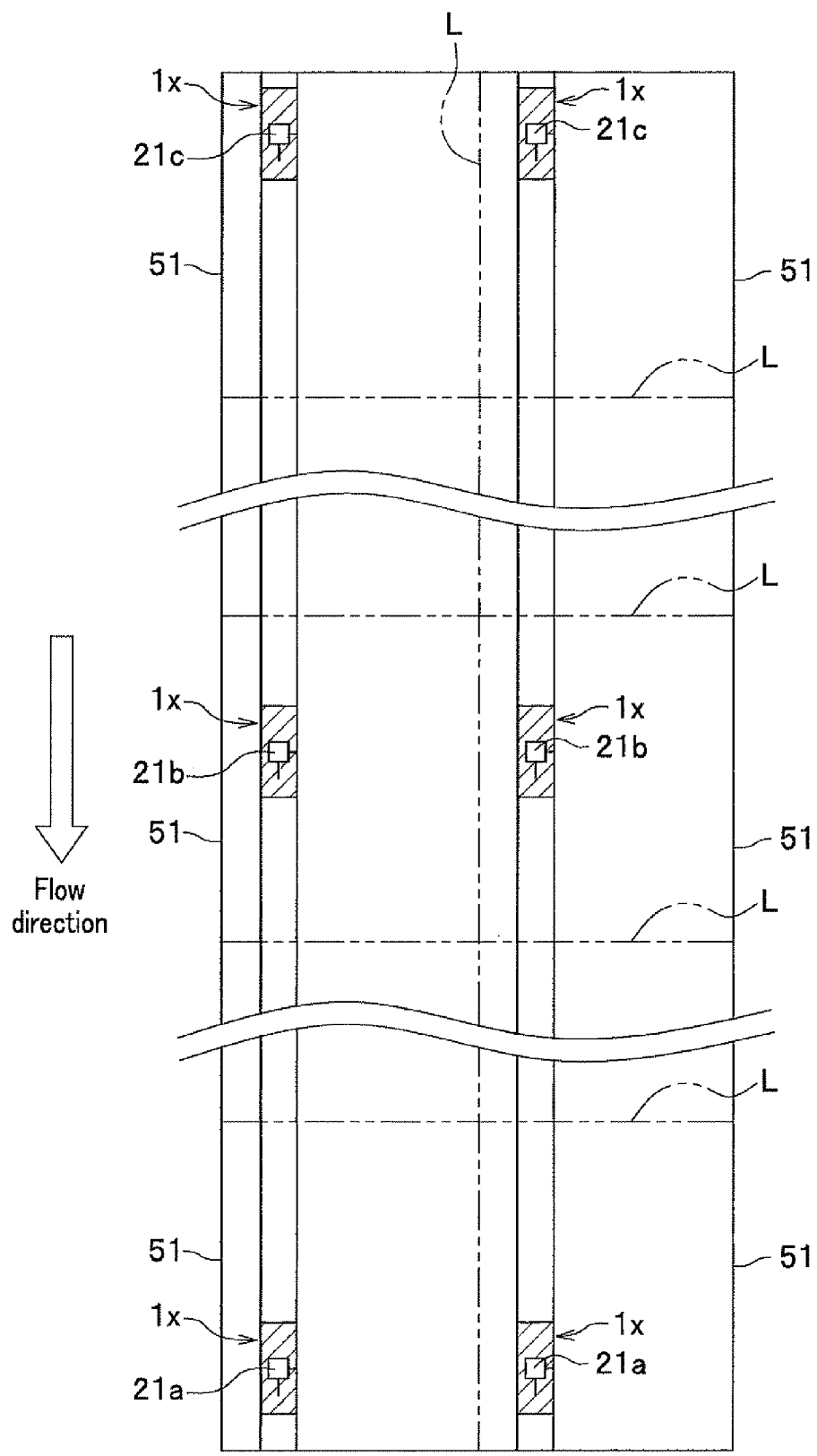

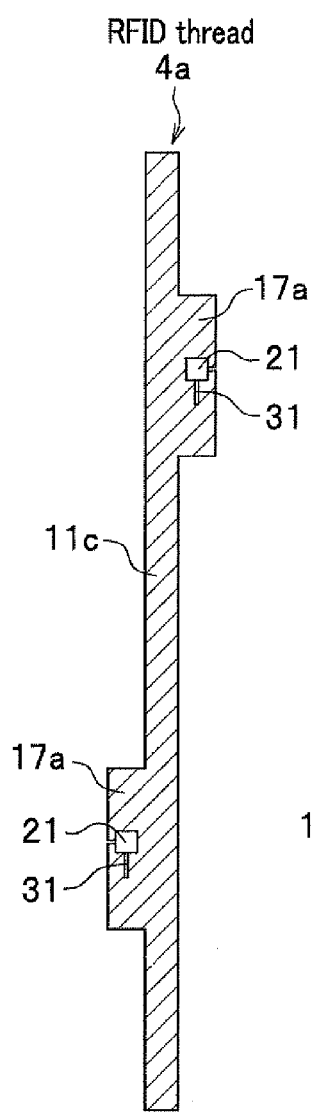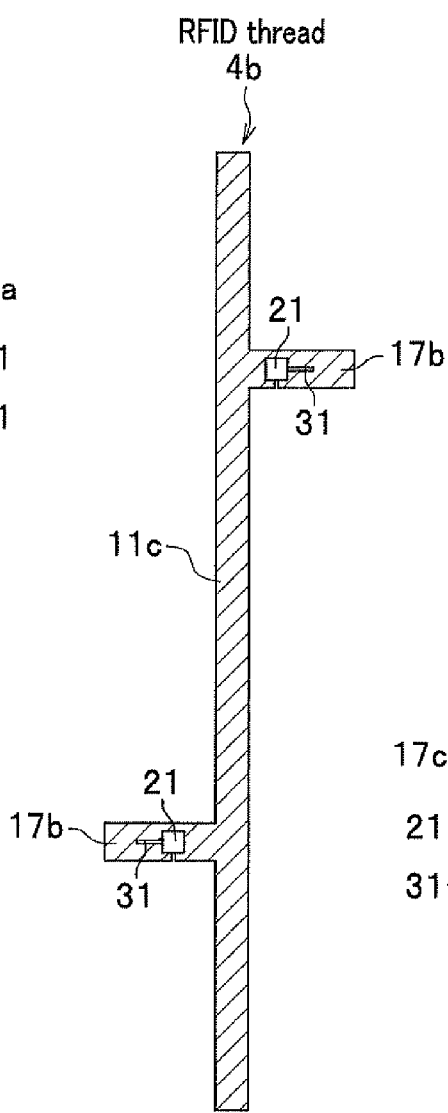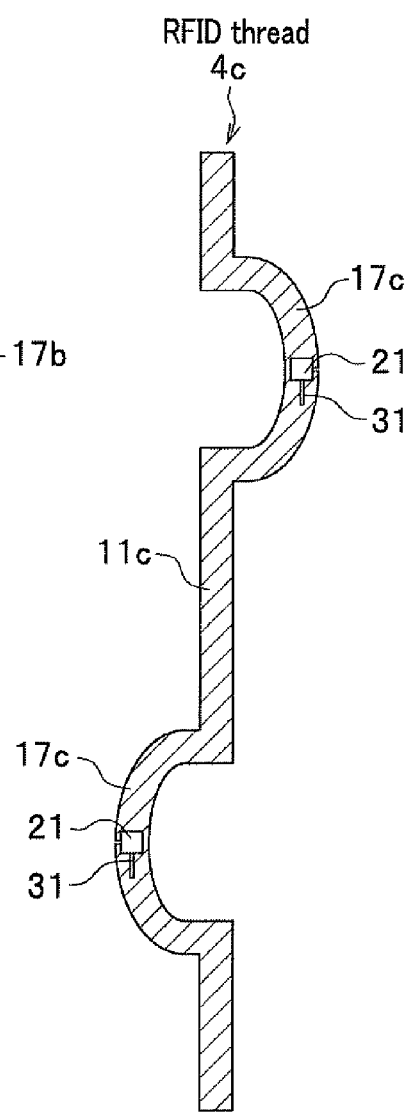

RFID THREAD, SHEET WITH RFID THREAD, AND PRINTING MACHINE FOR SHEET WITH RFID THREAD

CROSS REFERENCE TO RELATED APPLICATIONS

This application claims the foreign priority benefit under Title 35, United States Code, §119(a)-(d) of Japanese Patent Application No. 2008-148580, filed on Jun. 5, 2008, the contents of which are hereby incorporated by reference.

BACKGROUND OF THE INVENTION

1. Field of the Invention

The present invention relates to an RFID (Radio Frequency Identification) thread which transmits information such as ID (Identification) recorded in an IC chip through RF (Radio Frequency), a sheet with the RFID thread, and a printing machine for the sheet with the RFID thread.

2. Description of Relevant Art

With the progress of copying technology, since a fine copy is easily obtained, there is no end of events to illegally copy and use a bill and a security pass. For preventing these illegal acts, a watermark (black watermark) has been used for a bill. In addition, a medium which is required for easy verification of authenticity, for example, a bill, security pass, show ticket, and ID card in recent years is likely to be provided with an action, for example, for putting a hologram seal thereon or skimming a thread therein. Further, as a high-tech anti-counterfeit technology, for example, a semiconductor chip is fixed on these forms or embedded in the papers.

An anticounterfeit thread with an IC chip has been developed, in which a metal evaporated film is formed on one side of a polyester film and a semiconductor chip with an external antenna mounted on the chip is pasted on the upper side of the film (see Japanese Patent Laid-Open Publication No. 2004-139405, FIG. 2). In the thread, a marker is formed between the IC chips and positions of the IC chips can be identified. In addition, when a paper containing a thread is manufactured, since the thread is stretched due to a tensile force applied thereon when the thread is inserted into the paper, a position of the IC chip on the thread is controlled by controlling the tensile force to be applied on the thread.

According to the technology described in the Japanese Patent Laid-Open Publication No. 2004-139405, a thread on which an IC chip is mounted on a medium such as a paper is mounted. However, a papermaking machine is operated at high speed, and a paper skimming speed ranges from 200 m/minute to 1500 m/minute at higher speed. In the papermaking machine being operated at such a high speed, it is not easy to control a tensile force of the thread for controlling a position of the IC chip. Since a paper is skimmed at high speed, it is easy to think that a small displacement of a position of the IC chip causes a large displacement of the position after a few seconds. In addition, a paper in which a position of the IC chip is displaced becomes a defective paper since information of the IC chip can not be read, and the paper is recycled. Accordingly, the environmental load and cost are increased.

The present invention has been developed considering the problems described above, and it is an object of the present invention to provide an RFID thread which can be easily mounted on a sheet without precisely controlling a mounting position of an IC chip when the RFID thread is mounted on the sheet such as a paper, the sheet with the RFID thread, and a printing machine for the sheet with the RFID thread.

SUMMARY OF THE INVENTION

To solve the problems described above, there is provided an RFID thread which is mounted on a sheet and whose predetermined information can be read wirelessly from outside, which includes an IC chip, a first antenna mounting the IC chip and consisting of an electrically continuous conductor, and a base film, wherein the first antenna has a length corresponding to a size of the sheet. In addition, a sheet on which the RFID thread is mounted and a form cut from the sheet are included in the present invention.

According to the present invention, since a continuous antenna is disposed on one side of a form, information recorded in an IC chip can be continuously read by the antenna. Therefore, when a thread is inserted into, for example, a paper, it is unnecessary to control a position of the IC chip, and the RFID thread which enables manufacturing an RFID thread mounted sheet with high yield can be provided.

BRIEF DESCRIPTION OF THE DRAWINGS

FIG. 3 is a plan view showing a fixing position of an RFID thread according to the first embodiment;

FIG. 8 is a plan view showing an example of a mounting position of an IC chip when an RFID thread of a comparative example is used;

FIG. 14A to FIG. 14C are plan views schematically showing basic structures of RFID threads of modified examples according to the fourth embodiment;

DETAILED DESCRIPTION OF THE PREFERRED EMBODIMENT

Hereinafter, best modes (hereinafter, referred to as "embodiment") for embodying the present invention will be described in detail by referring to respective attached drawings using several examples.

First Embodiment

Figure 1:
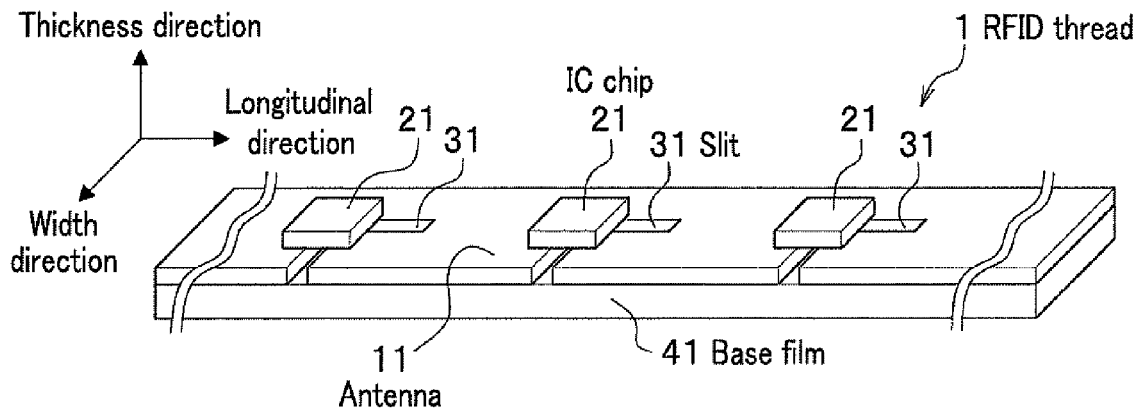
FIG. 1 is a perspective view schematically showing a basic structure of an RFID thread according to a first embodiment of the present invention.

FIG. 1 is a perspective view schematically showing a basic structure of an RFID thread 1 according to a first embodiment of the present invention. In the figure, a dimension in the width direction is magnified in comparison with that in the longitudinal direction, and a dimension in the thickness direction is magnified in comparison with that in the width direction. That is, the RFID thread 1 practically has an elongate and extremely thin shape, rather than the shape shown in FIG. 1.

The RFID thread 1 includes an IC chip 21, antenna 11 (first antenna, the same below), and base film 41.

The IC chip 21 is connected to the antenna 11 and includes a transceiver circuit which receives a high-frequency signal via the antenna 11 and transmits a high-frequency signal to the antenna 11 corresponding to the reception of the signal. In addition, the IC chip 21 includes a power extraction circuit which extracts a driving power from the high-frequency signal to start the IC chip 21, a clock circuit which generates a clock signal from the high-frequency signal, a unique data such as an identifier assigned to each IC chip 21, a control program, an auxiliary storage unit for storing a processing program and etc., with non-volatility, a CPU which is responsible for arithmetic computation and control in the IC chip 21, and a main memory unit which provides a processing region of the CPU (all not shown).

The antenna 11 consists of a continuous tape conductor which has a dimension which is substantially uniform and extremely small in the thickness direction (that is, thin film shape), has a predetermined dimension in the width direction, and has an extremely large dimension in the longitudinal direction. On the antenna 11, a slit 31 having an L-shape is disposed at predetermined intervals in the longitudinal direction. The IC chip 21 is connected to a place of the slit 31 of the antenna 11. The slit 31 has a function for matching an input and output impedance between the IC chip 21 and the antenna 11. The principle for matching the impedance will be described later by referring to FIG. 2A to FIG. 2D.

The base film 41 consists of a sheet insulator and has a function for holding the antenna 11. The base film 41 consists of a resin film made of, for example, PET (Polyethylene Telephthalate) or PEN (Polyethylene Naphthalate) or a paper.

It is noted that in the explanation, a paper which is manufactured in long size by a continuous papermaking machine and wound in roll is called a roll paper. In addition, a paper which is cut from the roll paper in a predetermined dimension (for example, Column A/Number 4, defined by Japanese Industrial Standards) is called a cut paper, and the cut paper for a specific use is called a form. The paper includes a paper board and nonwoven fabric, as well as a common paper which is manufactured by skimming fibers of plant pulp and the like. The sheet is an object which is formed flat using various kinds of materials, and typically, it is a paper or a plastic film.

As a specific example of manufactured RFID thread 1, the antenna 11 is made of aluminum film 20 μm thick and 2 mm wide. Using the IC chip 21 which is 300 μm square and 50 μm thick, the antenna 11 and IC chip 21 are bonded via a gold (Au) bump of an input/output terminal of the IC chip 21 by ultrasonic bonding. The base film 41 is made of PEN film 20 μm thick.

As another example of manufactured RFID thread 1, the base film 41 is made of paper, and the conductive antenna 11 is formed by printing a predetermined pattern on the base film 41 using a conductive paste such as a silver paste by, for example, ink-jet method and screen printing method. Subsequently, the antenna 11 and the input/output terminal of the IC chip 21 are bonded using a conductive adhesive.

By referring to FIG. 2A to FIG. 2D, a specific example will be explained in detail, in which the slit 31 for impedance matching is disposed on an antenna 11a (first antenna, the same below) and the IC chip is mounted thereon.

FIG. 2A to FIG. 2D are process views showing processes for mounting an IC chip on a power supply portion of an antenna 11a.

Figure 2A:
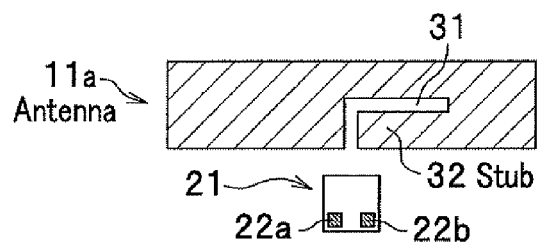
FIG. 2A to FIG. 2D are process views showing processes for mounting an IC chip on a power supply portion of an antenna.
Figure 2B:
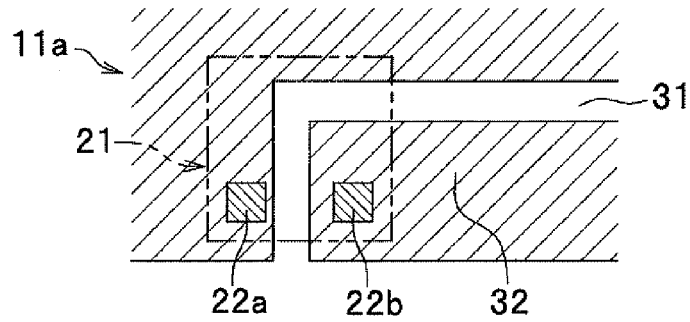
Figure 2C:
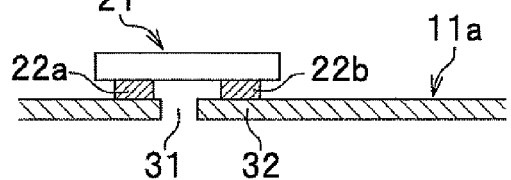

FIG. 2A is a perspective plan view showing the power supply portion of the antenna 11a and the IC chip 21. FIG. 2B is an enlarged perspective plan view showing the power supply portion when the IC chip 21 is mounted on the antenna 11a. FIG. 2C is a cross sectional view showing a bonding portion between the antenna 11a and the IC chip 21.

As shown in FIG. 2A, in the power supply portion of the antenna 11a, the slit 31 having a L-shape for impedance matching between the IC chip 21 and the antenna 11a is disposed, and a portion surrounded by the slit 31 having the L-shape in the slit 31 is formed as a stub 32. In addition, signal input/output electrodes 22a, 22b are disposed in the IC chip 21 at a distance so as to cross the slit 31.

Namely, since a width of the slit 31 is formed a little narrower than the distance between the signal input/output electrodes 22a, 22b of the IC chip 21, if the IC chip 21 is mounted on the antenna 11a as shown in FIG. 2B, the signal input/output electrodes 22a, 22b of the IC chip 21 are bonded to the power supply portion of the antenna 11a by crossing the slit 31. As described above, the stub 32 formed by forming the slit 31 is inserted in series between the antenna 11a and the IC chip 21. Therefore, the stub 32 operates as an inductance component connected in series between the antenna 11a and the IC chip 21. As a result, the input and output impedance matching between the antenna 11a and the IC chip 21 is achieved by the inductance component. Namely, an impedance matching circuit is formed by the slit 31 and the stub 32.

As shown in FIG. 2C, the signal input/output electrodes 22a, 22b of the IC chip 21 are electrically connected to the antenna 11a via a gold bump by, for example, ultrasonic bonding, metal eutectic bonding, or anisotropic conductive film (all not shown).

Figure 2D:
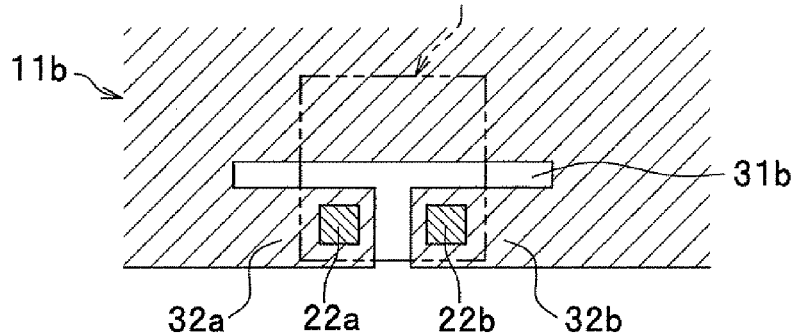

FIG. 2D is a schematic view showing that the IC chip 21 is mounted on a power supply portion of a slit 31b having a T-shape in an antenna 1ib (first antenna, the same below).

As shown in FIG. 2D, if stubs 32a, 32b are connected in series between the IC chip 21 and antenna 1ib by forming the slit 31b of the antenna 1ib into a T-shape, the impedance matching between the antenna 1ib and the IC chip 21 also can be achieved as with the case of the slit 31 having the L-shape.

FIG. 3 is a plan view showing a fixing position of an RFID thread 1 according to the first embodiment of the present invention.

As shown in FIG. 3, when the RFID thread 1 according to the embodiment is used, the antenna 11 is disposed in the longitudinal direction of a form 51 through the form 51. If the form 51 has A4 size, a length of the antenna 11 becomes approximately 300 mm and information of the IC chip 21 can be read within an area R1. A distance in the longitudinal direction of the area R1 becomes approximately 380 mm. In the RFID thread 1 according to the embodiment, information of the IC chip 21 can be read within the area R1 almost regardless of a mounting position of the IC chip 21 on the antenna 11. In addition, to be exact, a maximum communication distance (maximum distance capable of reading information) in a direction perpendicular to a surface of the form 51, that is, the direction perpendicular to the antenna 11 varies in the longitudinal direction of the antenna 11 with a period of 1/2λ. However, practically, the information of the IC chip 21 can be continuously read within the area R1 if a position for reading the information is near the antenna 11. Meanwhile, 1λ means one wavelength of the electromagnetic wave of the frequency used for the communication.

A positional relationship among IC chips 21a, 21b, 21c, a roll paper, and a form 51 according to the embodiment will be described by referring to FIG. 4. It is noted that the IC chips 21a, 21b, 21c are the IC chip 21 at respective positions.

Figure 4:
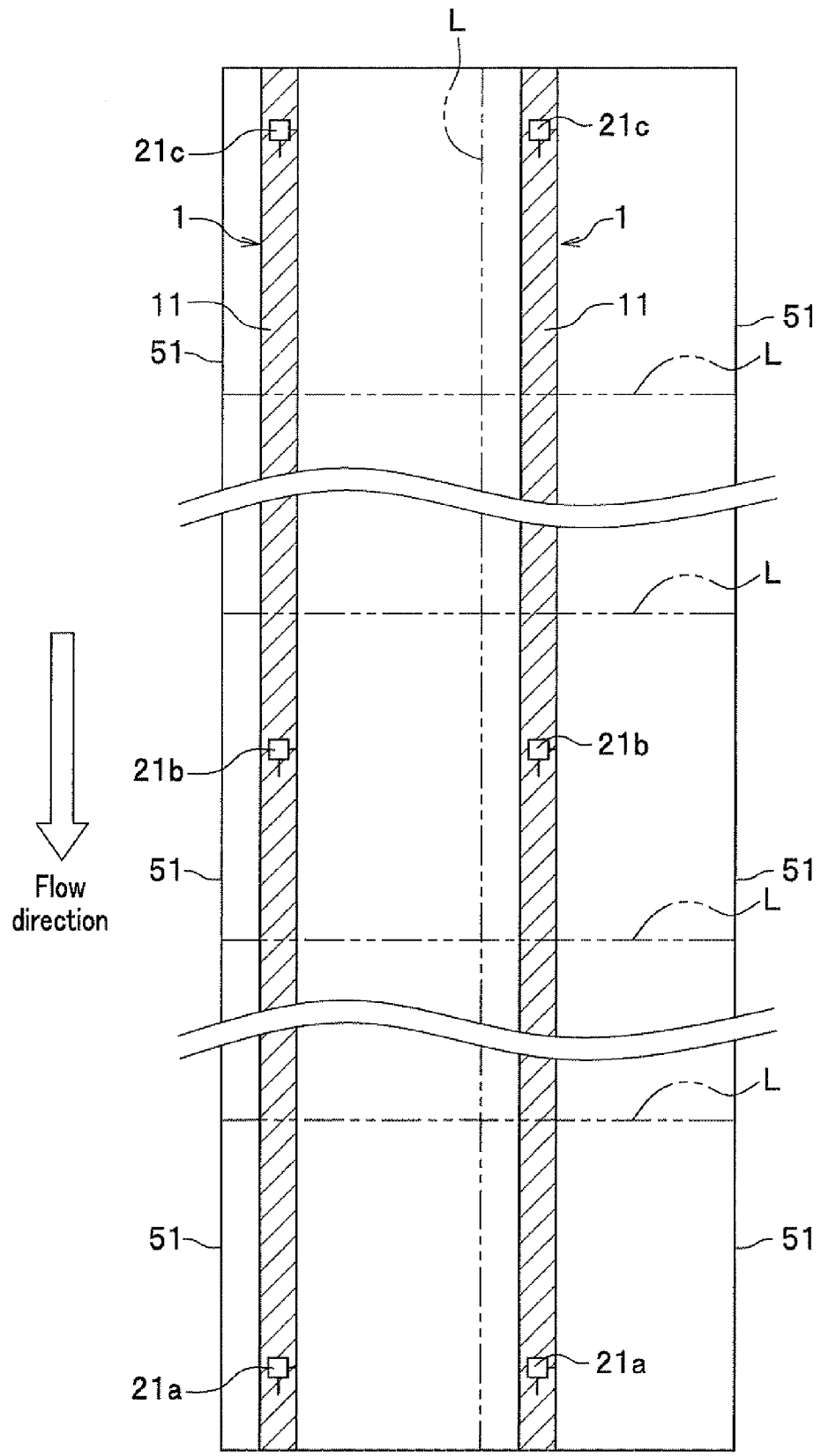
FIG. 4 is a plan view showing an example of a mounting position of an IC chip on an RFID thread according to the first embodiment.

FIG. 4 is a plan view showing an example of a mounting position of the IC chip 21 on the RFID thread 1 according to the first embodiment of the present invention.

As shown in FIG. 4, in the case of RFID thread 1 according to the embodiment, a roll paper on which the RFID thread 1 is mounted is manufactured in a flow direction (paper skimming direction) indicated by arrow. A dashed-two dotted line L indicates a cutting line of the roll paper into the form 51. First, the RFID thread 1 is set so that the IC chip 21a is arranged at approximately a heading position of the form 51. If the roll paper is continuously manufactured, a small stretch is generated in the RFID thread 1 due to a tensile force applied thereon. As a result, relative positions among the IC chips 21a, 21b, 21c are moved a little from respective original positions, and the positions of the IC chips 21b, 21c are displaced against the respective forms 51 as shown in FIG. 4. However, as shown in FIG. 3, since the area R1 capable of reading the RFID thread 1 is wide, the displacement of the reading position in the longitudinal direction of the RFID thread 1 is allowed, and a fine control of the papermaking machine, which is operated at high speed and in which a position is precisely adjusted, is not required.

As described above, according to the RFID thread 1 of the present embodiment, the papermaking can be performed without fine controlling the positional relationship between the IC chip 21 and form 51. Accordingly, the environmental load can be reduced through a simplification of the papermaking machine, improvement of the manufacturing speed, cost reduction, and yield improvement.

An interval between the IC chip 21a and IC chip 21b in the RFID thread 1 according to the first embodiment will be described by referring to FIG. 5A and FIG. 5B.

Figure 5A:
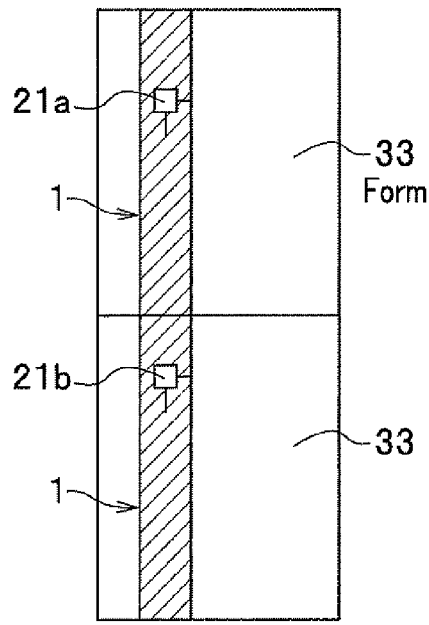
FIG. 5A and FIG. 5B are illustrations showing an interval of an IC chip in an RFID thread according to the first embodiment.

FIG. 5A shows an interval between the IC chips 21a, 21b suitable for a size of a form 33.

Figure 5B:
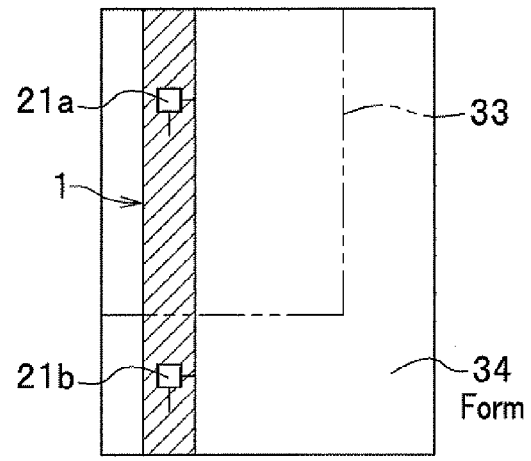

As shown in FIG. 5B, if the RFID thread 1 is mounted on a form 34 which is larger than the form 33, the two IC chips 21a, 21b may be mounted on the form 34. If information recorded in the IC chips 21a, 21b is read by a reader, two pieces of information of the IC chips 21a, 21b can be read. By combining the two pieces of information mutually within the database, a more highly reliable management can be achieved.

Comparative Example

Figure 6:
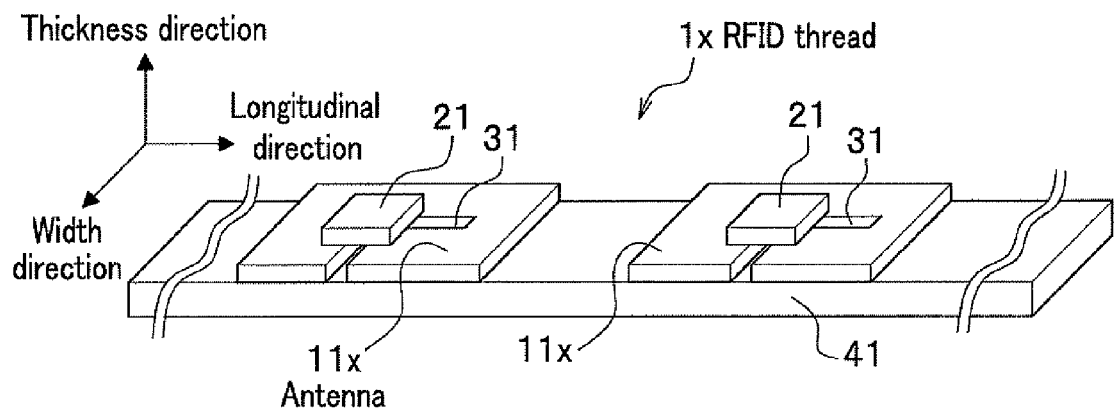
FIG. 6 is a perspective view schematically showing a basic structure of an RFID thread of a comparative example.

FIG. 6 is a perspective view schematically showing a basic structure of an RFID thread 1x of a comparative example.

As shown in FIG. 6, in the RFID thread 1x of the comparative example, an antenna 11x is formed on the base film 41 and the IC chip 21 is mounted on the antenna 11x. The antenna 11x is disposed at constant intervals.

Next, an area size capable of reading information recorded in the IC chip 21 of the RFID thread 1 of the first embodiment is compared with that of the RFID thread 1x of the comparative example.

Figure 7:
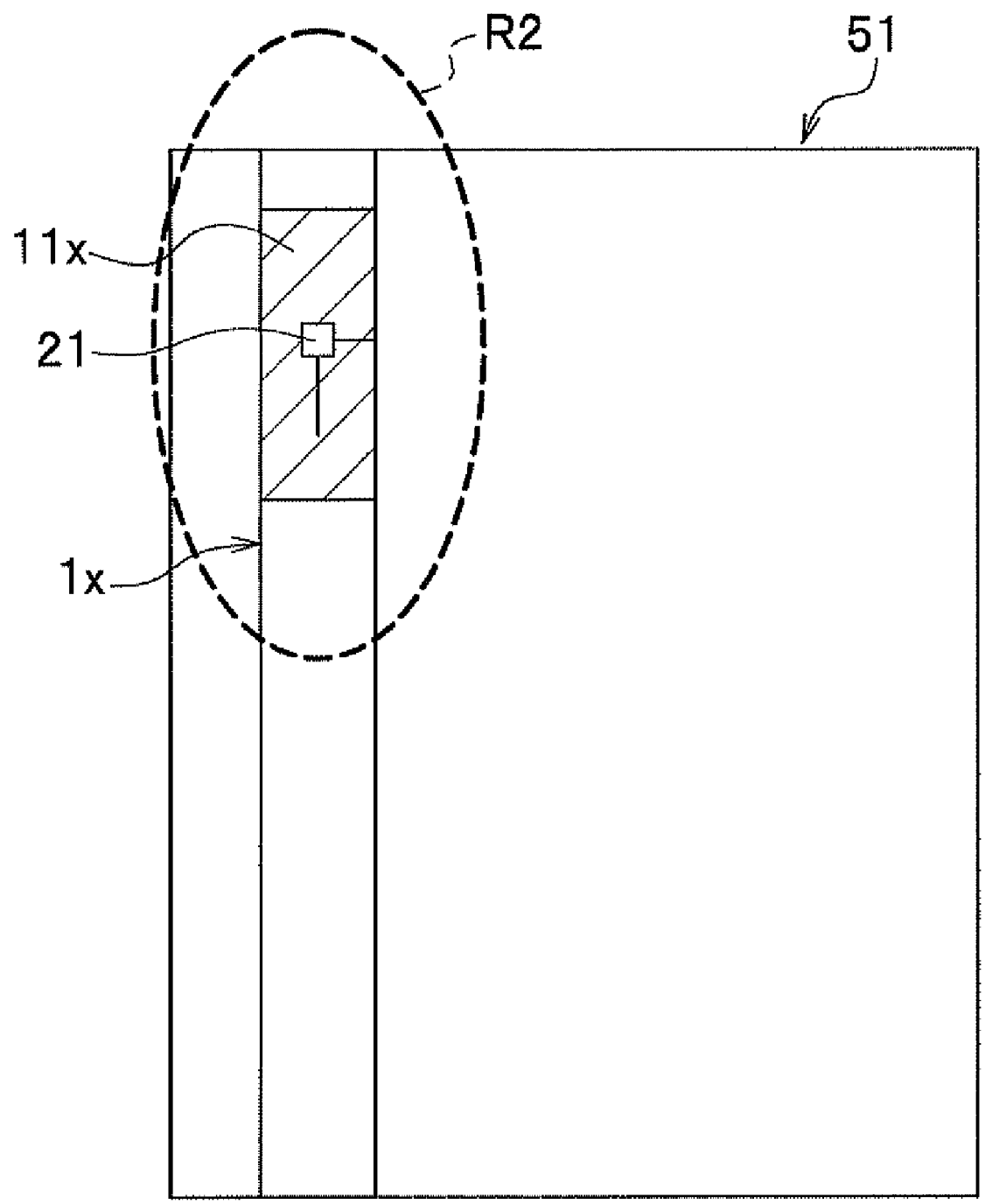
FIG. 7 is a plan view showing a fixing position of an RFID thread of a comparative example.

FIG. 7 is a plan view showing a fixing position of the RFID thread 1x of the comparative example.

Referring to FIG. 7, in the RFID thread 1x of the comparative example, information recorded in the IC chip 21 can be read around the antenna 11x centering on the IC chip 21, that is, within an area R2. Specifically, for example, assuming that the frequency is 2.4 GHz band, an RF output power of the reader (not shown) is 200 mW, and an antenna gain is 6 dBi, a readable length in the longitudinal direction of the RFID thread 1x becomes approximately 100 mm. The antenna 11x is a half-wave dipole antenna, and considering the wavelength shortening rate, the readable length becomes approximately 53 mm.

In the RFID thread 1x of the comparative example, since an arrangement pitch of the IC chip 21 must be the same with a form size, a plurality of RFID threads 1x having different arrangement pitches of the IC chip 21 are required for each form size. In addition, if the RFID thread 1x having a larger interval of the IC chip 21 than the form size is used, a cutting scrap is produced, thereby resulting in cost increase for, for example, regeneration treatment.

Referring to FIG. 8, a positional relationship among the IC chips 21a, 21b, 21c, roll paper, and form 51 in the case of RFID thread 1x of the comparative example will be described.

FIG. 8 is a plan view showing an example of a mounting position of the IC chip 21 when the RFID thread 1x of the comparative example is used.

As shown in FIG. 8, when the RFID thread 1x of the comparative example is used, a roll paper on which the RFID thread 1x is mounted is manufactured in a flow direction indicated by arrow. A dashed-two dotted line L indicates a cutting line of the roll paper into the form 51. First, the RFID thread 1x is set so that the IC chip 21a is precisely arranged at a heading position of the form 51. If the roll paper is continuously manufactured, a small stretch is generated in the RFID thread 1x due to a tensile force applied thereon. As a result, relative positions among the IC chips 21a, 21b, 21c are moved a little from respective original positions, and the positions of the IC chip 21b and IC chip 21c are displaced against the respective forms 51 as shown in FIG. 8. Even if positions of the IC chip 21 and the form 51 are fine adjusted, a control of the papermaking machine, which is operated at high-speed, is not easy. In addition, if a plurality of lines of the RFID thread 1x are mounted on one roll paper, a further complex control is required to concurrently control the tensile forces of the plurality of RFID threads 1x.

Second Embodiment

Figure 9A:
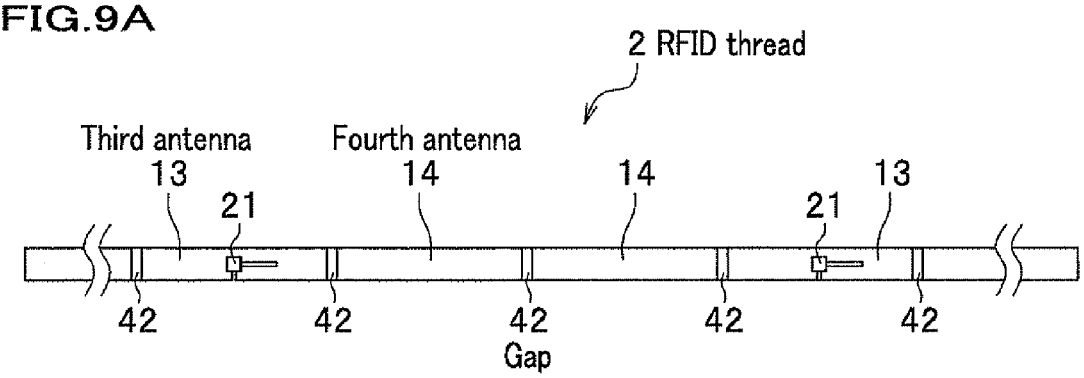
FIG. 9A is a plan view of an RFID thread according to a second embodiment of the present invention.
Figure 9B:
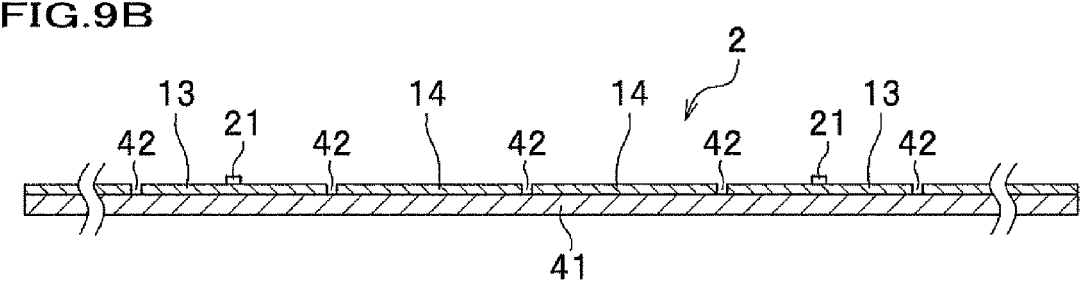
FIG. 9B is a side view of the RFID thread according to the second embodiment.

FIG. 9A is a plan view of an RFID thread 2 according to a second embodiment of the present invention, and FIG. 9B is a side view of the RFID thread 2 according to the second embodiment.

As shown in FIG. 9A and FIG. 9B, the RFID thread 2 of the second embodiment is the one combining a third antenna 13 on which the IC chip 21 is mounted and a fourth antenna 14 which is a passive device close to the third antenna 13, and electrically operates similar to the continuous antenna 11 (see FIG. 1) on which the IC chip 21 is mounted.

The third antenna 13 on which the IC chip 21 is mounted and the fourth antenna 14 which is a passive device are both a half-wave dipole antenna or a resonant body at the frequency being used, and a gap 42 is disposed between the third antenna 13 and the fourth antenna 14. The gap 42 mechanically spaces the third antenna 13 and the fourth antenna 14. However, since the spacing distance is small, the third antenna 13 and the fourth antenna 14 adjacent to each other are electromagnetically coupled. Therefore, the third antenna 13 and fourth antenna 14 on the RFID thread 2 operate as a whole as one antenna which is synchronized with higher harmonic waves. The gap 42 is about 100 to 500 µm due to a machining accuracy of the antenna material. In addition, a length of the third antenna 13 may be made not more than a half wavelength, and if an adjustment of the interval between the IC chips 21 of the RFID thread 2 is required, the length of the third antenna 13 may be adjusted.

Since the third antenna 13 and the fourth antenna 14 are mechanically divided, if a large tensile force is applied to the RFID thread 2, the tensile force operates on the base film 41 which has a high stretch rate, and the gap 42 becomes larger. However, the antenna device is resistant to be broken. If the gap 42 becomes larger, the electromagnetic coupling between the third antenna 13 and the fourth antenna 14 becomes weak, but a lowering of the communication distance is little in comparison with the case when the antenna device is broken. As for the combination of the third antenna 13 and the fourth antenna 14, an arbitrary number of antennas 14 may be disposed against one third antenna 13. For example, the antennas are disposed as (third antenna 13)—a plurality of (fourth antennas 14)—(third antenna 13) in this order.

In addition, by using a uniaxially-stretching film having a minimum strength resistant to the maximum tensile force operated on the RFID thread 2 in the mounting process as the base film 41, the form 51 which is easily torn by hand can be manufactured.

Figure 10A:
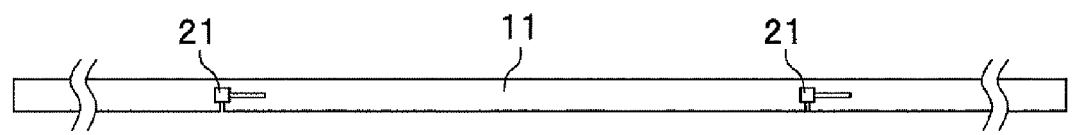
FIG. 10A is a plan view of the RFID thread according to the first embodiment.
Figure 10B:
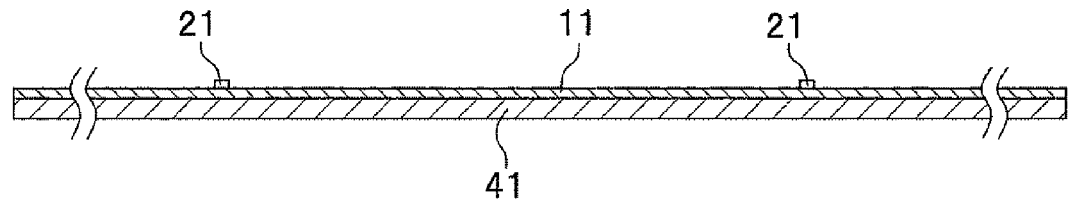
FIG. 10B is a side view of the RFID thread according to the first embodiment.

FIG. 10A is a plan view of the RFID thread 1 according to the first embodiment, and FIG. 10B is a side view of the RFID thread 1 according to the first embodiment.

Comparing with the RFID thread 2 of the second embodiment, in the RFID thread 1 of the first embodiment, when a large tensile force is operated on the antenna 11 which is a continuous tape held by the base film 41, a conductor of the antenna material, for example, aluminum is likely to be fractured. This is because a stretch rate of metal of the antenna 11 material is lower than that of the resin base film 41, and the metal antenna 11 is fractured first accordingly. In addition, the communication distance may be seriously lowered in some case depending on a fracture point of the antenna 11.

According to the RFID thread 2 of the second embodiment of the present invention, the antenna device can be prevented from fracturing, thereby resulting in prevention of lowering the communication distance due to the fracture.

Third Embodiment

A sheet, that is, a paper on which a thread is mounted will be described here.

Figure 11:
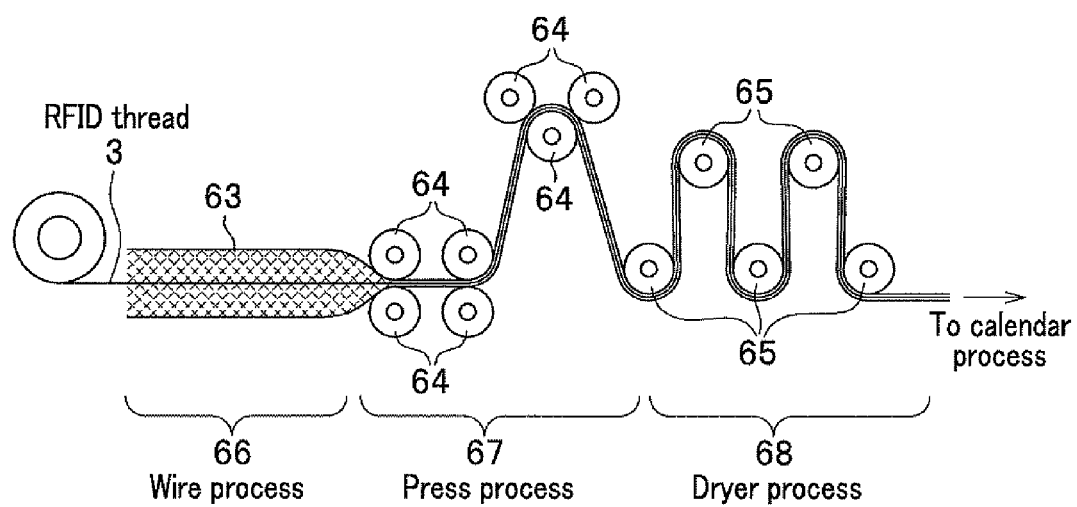
FIG. 11 is a schematic view showing a papermaking process for mounting an RFID thread according to a third embodiment of the present invention.

FIG. 11 is a schematic view showing a papermaking process for mounting an RFID thread 3 according to a third embodiment of the present invention.

In a wire process 66, the RFID thread 3 is inserted into a white water 63 in which pulp and etc. are dissolved. Next, in a press process 67, the paper is pressed by a roller 64 to squeeze the water out. Subsequently, in a dryer process 68, the paper is passed through a plurality of rollers 65 to dry by heating.

Corrugation and peeling off in the portion of the RFID thread 3 is likely to be generated in the press process 67 and dryer process 68. This depends on adhesiveness between the base film 41 and antenna 11 in the portion of the RFID thread 3 and the paper. If the adhesiveness of the RFID thread 3 to the paper is different between the front side and back side of the RFID thread 3, for example, only the paper on the side of the base film 41 appears to be stretched, and eventually, the corrugation is generated.

Figure 12:
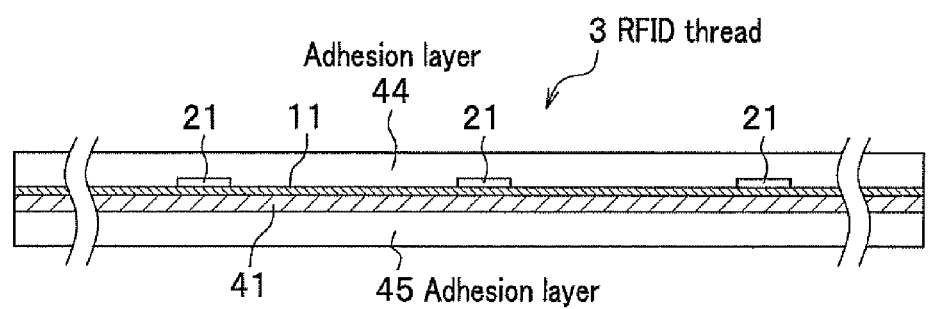
FIG. 12 is a longitudinal sectional view showing an RFID thread according to the third embodiment.

FIG. 12 is a longitudinal sectional view showing the RFID thread 3 according to the third embodiment.

In the RFID thread 3 of the third embodiment, front and back sides of the structure described in the first and second embodiments are newly coated with the same material. With the coating described above, contacting conditions of the RFID thread 3 with front and back sides of a sheet such as a paper can be made uniform.

As shown in FIG. 12, an adhesion layer 44 is formed on the front side of the RFID thread 3 body consisting of the antenna 11, IC chip 21, and base film 41, and an adhesion layer 45 is formed on the back side thereof. A thermoplastic resin is used for the adhesion layers 44, 45, and adhesiveness between the RFID thread 3 body and the paper is increased by utilizing heat treatment in the dryer process 68 or the calendar process in the later process. Through the processes described above, an RFID thread mounting paper which is excellent in design and endurance can be manufactured. As a thermoplastic adhesive, a hot-melt adhesive is used. Specifically, a rubber-based hot-melt adhesive or EVA-based hot-melt adhesive may be used, and the adhesive whose melting temperature (or softening temperature) is not more than the maximum temperature of the dryer process 68 (see FIG. 11) or the calendar process in the latter process is selected. In the present embodiment, EVA-based hot-melt adhesive 40 µm thick was used.

According to the third embodiment of the present invention, when the RFID thread 3 is mounted on the sheet, generation of the corrugation on the mounting place of the RFID thread 3 and peeling off of the surface paper can be prevented.

Fourth Embodiment

If the form 51 on which the RFID thread 1 is mounted as shown in FIG. 3 is folded back at approximately the center of the longitudinal direction, an impedance matching circuit just below the IC chip 21 is overlapped with the antenna 11 located on the folded portion. As a result, characteristics of the impedance matching circuit are changed and an area capable of reading information recorded in the IC chip 21 becomes narrow.

A method for avoiding the phenomena described above will be described by referring to FIG. 13.

Figure 13:
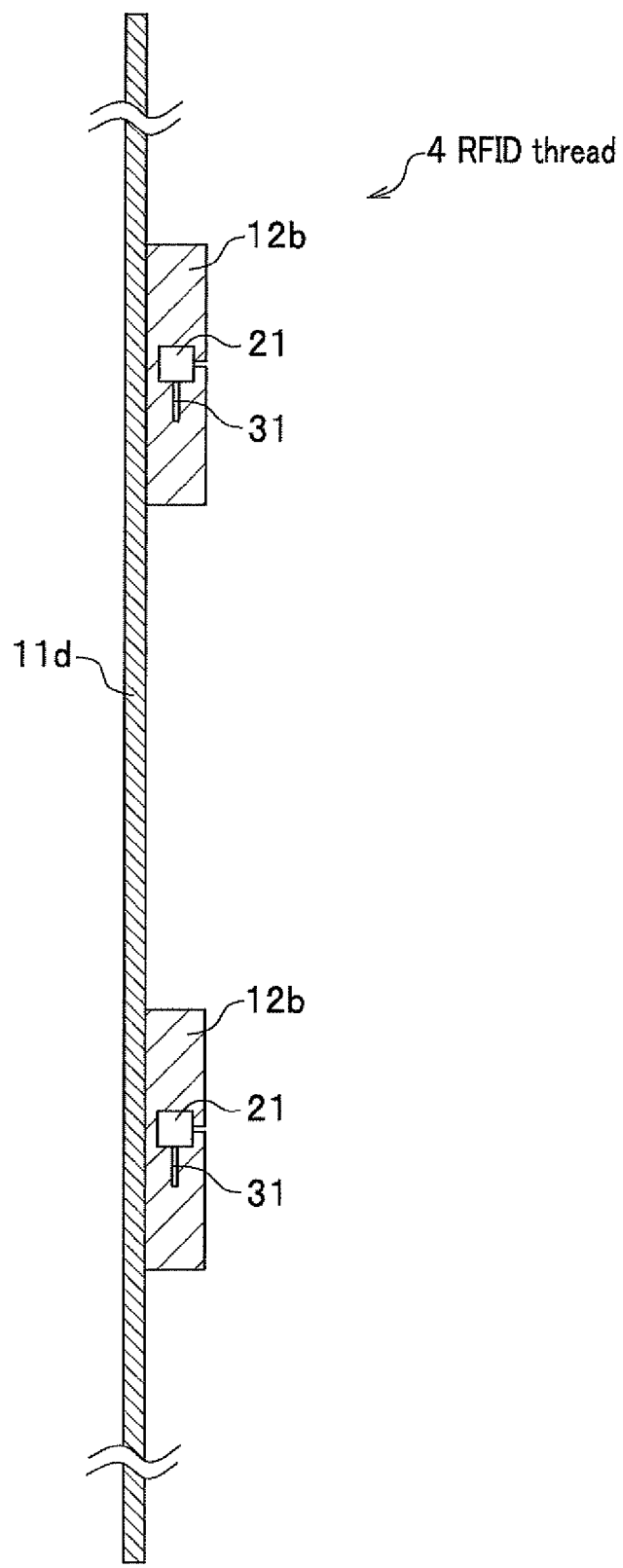
FIG. 13 is a plan view schematically showing a basic structure of an RFID thread of a basic example according to a fourth embodiment of the present invention.

FIG. 13 is a plan view schematically showing a basic structure of an RFID thread 4 of a basic example according to a fourth embodiment of the present invention.

A first antenna 11d is formed with a metal film 50 to 500 µm wide or a fine conductive wire, and the IC chip 21 is mounted on a second antenna 12b which is shorter than the first antenna 11d. In the second antenna 12b, a slit 31 to be an impedance matching circuit is formed. The first antenna 11d and the second antenna 12b are electrically connected by direct contact or electromagnetically coupled by disposing them close to each other. The second antenna 12b which has a length of λ/6 to λ/2 well synchronizes with the high-frequency. Specifically, dimensions of the second antenna 12b are, for example, 2 mm wide and 25 mm long.

Another embodiment will be described by referring to FIG. 14A to FIG. 14C.

FIG. 14A to FIG. 14C are plan views schematically showing basic structures of RFID threads 4a, 4b, 4c of modified examples according to the fourth embodiment.

As shown in FIG. 14A, the RFID thread 4a which is a first modified example of the fourth embodiment has a shape in which a mounting portion 17a of the IC chip 21 is shifted to the right and left from the center of the first antenna 11c to divert the mounting portion 17a from the first antenna 11c.

As shown in FIG. 14B, the RFID thread 4b which is a second modified example of the fourth embodiment has a shape in which a mounting portion 17b of the IC chip 21 is projected to the right and left from the center of the first antenna 11c at a right angle to divert the mounting portion 17b from the first antenna 11c.

As shown in FIG. 14C, the RFID thread 4c which is a third modified example of the fourth embodiment has a shape in which a mounting portion 17c of the IC chip 21 is rounded to the right and left from the center of the first antenna 11c to divert the mounting portion 17c from the first antenna 11c.

As shown in FIG. 4C, the RFID thread 4c which is a third modified example of the fourth embodiment has a shape in which a mounting portion 17c of the IC chip 21 is rounded to the right and left from the center of the first antenna 11c to divert the mounting portion 17c from the first antenna 11c.

As described, according to the fourth embodiment of the present invention, the RFID threads 4, 4a, 4b, 4c, can be prevented from lowering a reading capability, even if the RFID threads 4, 4a, 4b, 4c, are folded in the longitudinal direction.

Fifth Embodiment

Figure 15:
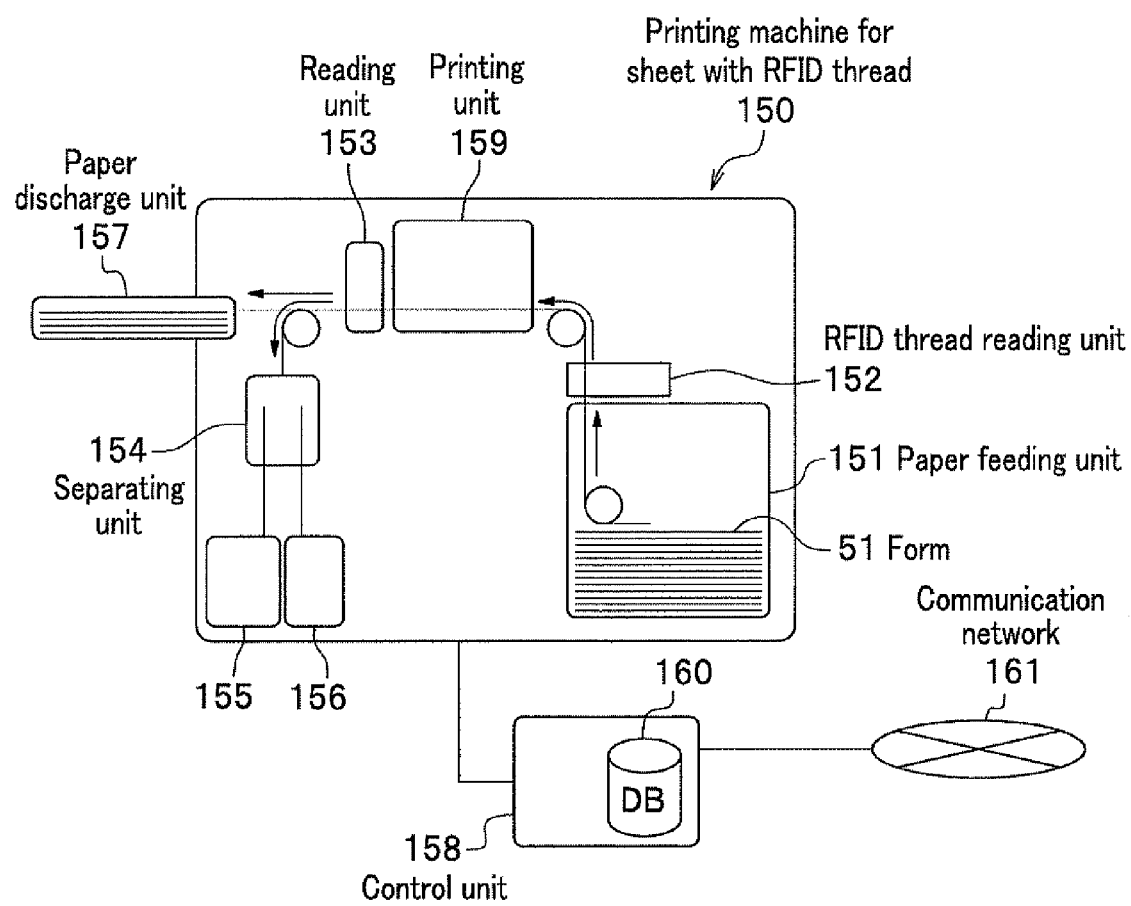
FIG. 15 is a schematic longitudinal sectional view showing a mechanism of a printing machine for a sheet with an RFID thread according to a fifth embodiment of the present invention.

FIG. 15 is a schematic longitudinal sectional view showing a mechanism of a printing machine 150 for a sheet with an RFID thread according to a fifth embodiment of the present invention.

A sheet such as a form 51 on which the RFID thread 1 is mounted may be used for a general printed material having no specific individual property. However, the form 51 can be preferably utilized for a printed material in which specific information is described on each form 51, for example, a printed material on which identification information such as a contact number and contractor name of an insurance certificate and the like are described.

A structure and operation of the printing machine 150 for a sheet with an RFID thread will be described.

The form 51 on which the RFID thread 1 is mounted is filled in advance in a paper feeding unit 151. If the printing machine 150 is switched on and an operation switch (not shown) in a control unit 158 is turned on, the paper feeding unit 151 carries the form 51 to a printing unit 159 by the control of the control unit 158. On the way of carrying, an RFID thread reading unit 152 consisting of an RFID thread reader and a reading antenna (both not shown) reads information of the IC chip 21 (see FIG. 1) mounted on the form 51.

If the information recorded in the IC chip 21 is correctly read out from the form 51, the readout information is recorded in a database 160 in the control unit 158. The recorded information in the database 160 can be utilized through a communication network 161 as well as utilized in the control unit 158. In addition, the control unit 158 generates printing information based on the readout information and transmits to the printing unit 159. The form 51 is carried to the printing unit 159 and the printing unit 159 performs printing based on the printing information. After completing the printing, a reading unit 153 reads again the information of the IC chip 21 mounted on the RFID thread 1. If the information of the IC chip 21 can be read, the form 51 is carried to a paper discharge unit 157.

If the information recorded in the IC chip 21 can not be correctly read from the form 51 by the RFID thread reading unit 152, the control unit 158 does not generate the printing information, the printing unit 159 does not perform printing on the form 51, and the form 51 passes through the printing unit 159 to be carried to a separating unit 154.

Figure 16:
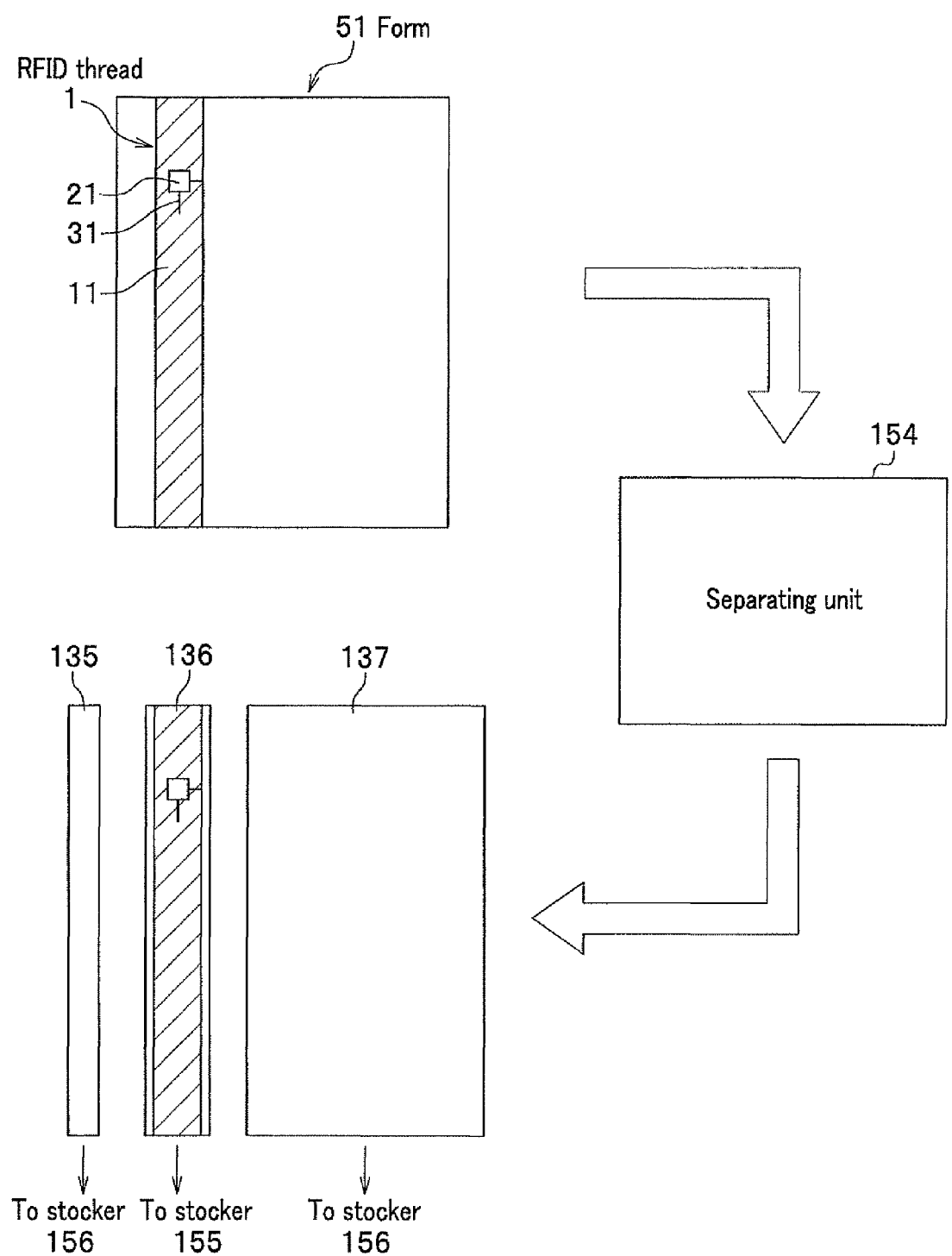
FIG. 16 is an illustration showing a separate collection of a form in detail.

FIG. 16 is an illustration showing a separate collection of a form 51 in detail.

The form 51 on which the RFID thread 1 is mounted consists of a thread portion 136 and paper portions 135, 137. The separating unit 154 cuts the form 51 into the paper portions 135, 137 and thread portion 136, and puts the thread portion 136 and paper portions 135, 137 into a stocker 155 and stocker 156, respectively, by separating.

Returning to FIG. 15, if information of the IC chip 21 can not be read out by the reading unit 153 even if the information was read out by the RFID thread reading unit 152, that is, if a trouble is generated, for example, in the IC chip 21 of the RFID thread 1 during a printing process of the printing unit 159, the form 51 is also carried to the separating unit 154 and the thread portion 136 and the paper portions 135, 137 are separately collected.

According to the fifth embodiment of the present invention, the following advantages can be obtained.

(1) Since a function of the RFID thread 1 is verified in the printing process, an inspection in the papermaking process can be neglected, thereby, a functional simplification and improvement of throughput of the papermaking machine can be achieved.

(2) Since a function of the RFID thread 1 is verified before the printing and a defective form 51 is removed, the printing cost can be reduced.

(3) Since a function of the RFID thread 1 is verified before and after the printing and a defective form 51 is removed, reliability of the printed form 51 to be carried to the paper discharge unit 157 can be improved.

(4) Since the thread portion 136 is separately collected, the environmental load can be reduced.

POSSIBILITY OF INDUSTRIAL APPLICABILITY

The RFID thread according to the present invention can be preferably utilized in sheets such as bills, securities, ID cards, documents of contract, and show tickets which are required to identify authenticity with certainty and ease.

What is claimed is:

1. A Radio Frequency Identification (RFID) thread which is mounted on a sheet and whose predetermined information can be read wirelessly from outside, the RFID thread comprising:

two Integrated Circuit (IC) chips recording the predetermined information;

a first antenna composed of an electrically continuous conductor which has a length corresponding to a size of the sheet and on which the two IC chips are mounted; and a base film made of resin for supporting the first antenna.

2. The RFID thread according to claim 1, further comprising:

an impedance matching circuit disposed in the first antenna for matching an input and output impedance between the IC chip and the first antenna, wherein the IC chip is mounted via the impedance matching circuit disposed on the first antenna.

3. The RFID thread according to claim 1, wherein the IC chip is electromagnetically coupled with the first antenna via a second antenna made of a conductor.

4. The RFID thread according to claim 3, wherein the IC chip is mounted via an impedance matching circuit formed in the second antenna for matching an input and output impedance between the IC chip and the second antenna.

5. The RFID thread according to claim 1, wherein the first antenna is made of a fine conductive wire.

6. The RFID thread according to claim 2, wherein the first antenna consists of a linear portion and a diverting portion, wherein the impedance matching circuit is formed in the diverting portion.

7. A Radio Frequency Identification (RFID) thread which is mounted on a sheet and whose predetermined information can be read wirelessly from outside, the RFID thread comprising:
an Integrated Circuit (IC) chip recording the predetermined information;
a first antenna composed of an electrically continuous conductor which has a length corresponding to a size of the sheet and on which one or a plurality of the IC chips are mounted; and
a base film made of resin for supporting the first antenna, wherein the RFID thread comprises:
an antenna group consisting of the first antenna on which the IC chip is mounted and third passive antennas at least one of whose electrical length is a half wavelength of a frequency being used,
wherein the antenna group is continuously disposed on the RFID thread.

8. The RFID thread according to claim 1, wherein the RFID thread includes a thermoplastic adhesive on one side or both sides of the RFID thread, wherein the thermoplastic adhesive softens or dissolves at a temperature lower than a treatment temperature in a calendar process or a dryer process of a papermaking process.

9. The RFID thread according to claim 1, wherein the base film is a uniaxially-stretching film.

10. A sheet with an RFID thread, on which the RFID thread according to claim 1, is mounted, cut into a length larger than a mounting interval of the IC chip.

11. A method for managing a sheet with an RFID thread, in which the RFID thread according to claim 1, is mounted on the sheet, comprising a step of:
registering pieces of ID information recorded in the IC chips which exists in an identical sheet with the RFID thread in a database by mutually linking the pieces of ID information.

12. A printing machine for a sheet with a Radio Frequency Identification (RFID) thread, comprising:
a paper feeding unit;
a first reading unit;
a printing unit;
a second reading unit;
a paper discharge unit;
a separating unit;
a separating stocker;
a control unit for controlling the units described above; and
a database for storing information,
wherein the printing machine conducts printing on the sheet with the RFID thread which is mounted on a sheet and whose predetermined information can be read wirelessly from outside,
wherein the RFID thread comprises:
an Integrated Circuit (IC) chip recording the predetermined information,
a first antenna composed of an electrically continuous conductor which has a length corresponding to a size of the sheet and on which one or a plurality of the IC chips are mounted, and
a base film made of resin for supporting the first antenna, and
wherein the base film is a uniaxially-stretching film.

13. The printing machine according to claim 12, wherein the first reading unit and the second reading unit read information from the IC chip fixed on a fed sheet with the RFID thread.

14. The printing machine according to claim 12, wherein when the first reading unit fails to read information of the IC chip from the sheet with the RFID thread, the control unit stops operation of the printing unit, passes the sheet, and carries the sheet to the separating unit.

15. The printing machine according to claim 12, wherein when the first reading unit or the second reading unit fails to read information of the IC chip from the sheet with the RFID thread, the control unit stops operation of the printing unit, passes the sheet, and transmits a signal to the paper feeding unit for feeding another sheet.

* * * * *